(12) United States Patent
Peana et al.

(10) Patent No.: US 9,720,451 B2
(45) Date of Patent: Aug. 1, 2017

(54) INFORMATION HANDLING SYSTEM PORT SEAL

(71) Applicant: Dell Products L.P., Round Rock, TX (US)

(72) Inventors: Stefan Peana, Austin, TX (US); Munif M. Farhan, Round Rock, TX (US); Mark A. Schwager, Cedar Park, TX (US); David M. Meyers, Round Rock, TX (US); Brian Hargrove Leonard, Austin, TX (US); Lawrence E. Knepper, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/952,173

(22) Filed: Nov. 25, 2015

(65) Prior Publication Data

US 2017/0147039 A1    May 25, 2017

(51) Int. Cl.
*G06F 1/16* (2006.01)
*G06F 1/18* (2006.01)

(52) U.S. Cl.
CPC ............ *G06F 1/1656* (2013.01); *G06F 1/181* (2013.01)

(58) Field of Classification Search
CPC .... G06F 1/1656; G06F 1/1613; G06F 1/1626; G06F 1/182; G06F 2200/1633; G06F 1/181; H05K 5/06
USPC ........................................ 361/679.4; 137/807
See application file for complete search history.

(56) References Cited

U.S. PATENT DOCUMENTS

| 6,991,490 B1 * | 1/2006 | Su ...................... H01R 13/5213 439/136 |
| 8,020,573 B2 * | 9/2011 | Lamers ..................... A61L 9/14 137/12 |

* cited by examiner

*Primary Examiner* — Anthony Haughton
*Assistant Examiner* — Ingrid Wright
(74) *Attorney, Agent, or Firm* — Terrile, Cannatti, Chambers & Holland, LLP; Robert W. Holland

(57) ABSTRACT

An information handling system opening, such as at a cable port, selectively closes and opens through inflation and deflation of a seal, such as an expanding balloon structure interfaced with a microfluidic reservoir. The seal fills the opening to block contaminants from entering the information handling system and deflates to provide room for cables to pass when desired. Automated sealing of a port is provided in response to detection of contaminants, such as liquids or dust.

14 Claims, 5 Drawing Sheets

INFORMATION HANDLING SYSTEM PORT SEAL

BACKGROUND OF THE INVENTION

Field of the Invention

The present invention relates in general to the field of information handling system component management, and more particularly to an information handling system fluidic component manager.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a variety of hardware components that cooperate to process information. For example, a central processing unit (CPU) executes instructions to process information stored in a random access memory (RAM). The information is typically stored in persistent storage devices, such as flash memory or a hard disk drive, and made accessible by controllers and firmware included in a chipset. The information is typically communicated through network interfaces, such as an Ethernet interface with a local area network (LAN) or a wireless interface with a wireless network, such as wireless local area network (WLAN) or wireless wide. The information is typically presented as visual images at a display by processing visual information into pixel values with a graphics processor unit (GPU). Manufacturers of information handling systems select hardware components of various types and capabilities in order to adapt an information handling system to an intended purpose, such as serving information, creating information, presenting information, communicating information, etc.

Information handling systems are built in a variety of chassis and/or housing structures that are generally adapted to the environment of their intended use. One example is a server information handling system built in an open chassis and held in a rack stacked with multiple other server information handling systems. Since server information handling systems are typically supported in designated locations with cooling and power infrastructure, a housing for protection from environmental danger and/or damage does not typically enclose the hardware components. Another example is a desktop information handling system designed to operate in an office environment. Desktop systems operate in a controlled environment but face some risk of damage due to spilled fluids, dust or unfriendly thermal conditions. Since desktop systems are not generally used in a portable manner, the housing around a desktop typically has extra room to hold hardware components in a raised position that limits exposure to fluids and increases volume for cooling airflow to manage thermal conditions. Although server and desktop systems have fewer constraints on the chassis and housing sizes when compared with portable information handling systems, manufacturers do generally attempt to efficiently build hardware components into available space. For example, server information handling systems typically have standard-sized spaces within a rack so that hardware components have a defined space. In order to provide desired processing functionality and cost goals, manufacturers attempt to allocate hardware components to available space in an efficient manner.

Portable information handling systems typically have tighter space constraints than server and desktop systems, and also tend to face a greater risk of environment damage. Generally portable information handling systems have housings designed to be carried by end users and used on-the-go. Portability generally means greater shock and vibration to components, increased risk of fluid and contaminant damage, and increased risk of loss of the system. To provide a portable system, manufacturers tend to select hardware components that have minimal size, thermal profile and power consumption. These hardware components are often tightly packed into housings that have minimal height and minimal internal air gaps so that generating a cooling airflow is often difficult and sometimes completely avoided by relying on passive cooling. In many instances, minimal numbers of power and communication ports are included so that the housing provides improved protection against dust and fluid damage. For example, many tablet and smartphone information handling systems have a single communication port that doubles as a power connector, such as with a USB cable.

One difficulty shared by all types of information handling systems is the security of data, whether by loss of data through unauthorized network accesses or physical loss of a system that stores data. Password, firewall and other security measures helps to alleviate this risk, however, as long as a system remains accessible at a network or capable of powering up, a determined hacker will usually be able to obtain at least some level of unauthorized access. Another difficulty is damage from contaminants, such as dust and fluids. Although manufacturers can include structures within an information handling system to help protect against data loss and contaminants, size constraints restrict the types of structures that are available.

SUMMARY OF THE INVENTION

Therefore, a need has arisen for a system and method which provides an information handling system structure of minimal size that provides security against data loss and contaminant damage.

In accordance with the present invention, a system and method are provided which substantially reduce the disadvantages and problems associated with previous methods and systems protection against data loss and contaminant damage. A microfluidic reservoir interfaces with one or more microfluidic bladders through communication channels and selectively inflates and deflates the one or more microfluidic bladders to manipulate physical components for desired data loss and contaminant protection measures.

More specifically, an information handling system processes information with components disposed in a chassis or housing, such as a processor, memory devices, communication devices, power devices, etc. Components that interface with external peripherals through a communication port accept a cable inserted into a connector disposed in the port. Access to the port is selectively sealed and unsealed by inflation and deflation of microfluidic bladders located proximate the port. Microfluidic bladders may aid in sealing a port lid or door by inflating when the door closes or may seal a port without a door by filling the port with the bladder. Control to initiate bladder sealing may be manually asserted by an end user or automatically initiated by detection of cable insertion or removal, the presence of contaminants, or other factors. In one embodiment, a seal of one or more microfluidic bladders inflates around a cable after insertion of the cable in a port to seal off the cable and port while the cable is inserted.

Information handling system security is provided by selective inflation and deflation of microfluidic bladders that manipulate physical components. For example, inflation of a bladder proximate to a connector physically disconnects the connector so that operations associated with connected device are disabled. In the event a security monitor at an information handling system detects a data security threat, components subject to the threat are powered down on disconnected from communication links while the threat is detected. The disconnection of a connector may involve a physical movement of the connected component or may involve interference with electrical signals sent through the connector. If the threat involves a physical loss of an information handling system, inflation of a microfluidic bladder can selectively destroy portions of the information handling system that include sensitive data, such as by destroying a hard disk drive platter.

The present invention provides a number of important technical advantages. One example of an important technical advantage is that information handling systems have effective seals to prevent water and other contaminants from getting into a housing with a minimal structural presence that does not substantially impact the size of the information handling system. Microfluidic channels integrated into a motherboard layer transfer fluids to desired bladders that remain minimal in size when not in use. Automated inflation and deflation of the bladders minimizes the impact on the end user while securing the housing from contaminant ingress. Further, the presence of a microfluidic reservoir and communication channels allows strategic placement of bladders in locations to manipulate processing components on a physical level. Security of an information handling system is enhanced since physical connections to data, communication and power resources may be manipulated by a trusted embedded processor with selective inflation of bladders proximate to processing component connectors. System security is provided on a physical level with minimal structural size, power consumption and complexity.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Microfluidic communication disposed in an information handling system selectively manipulates processing components with a physical presence to aid system management and security. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
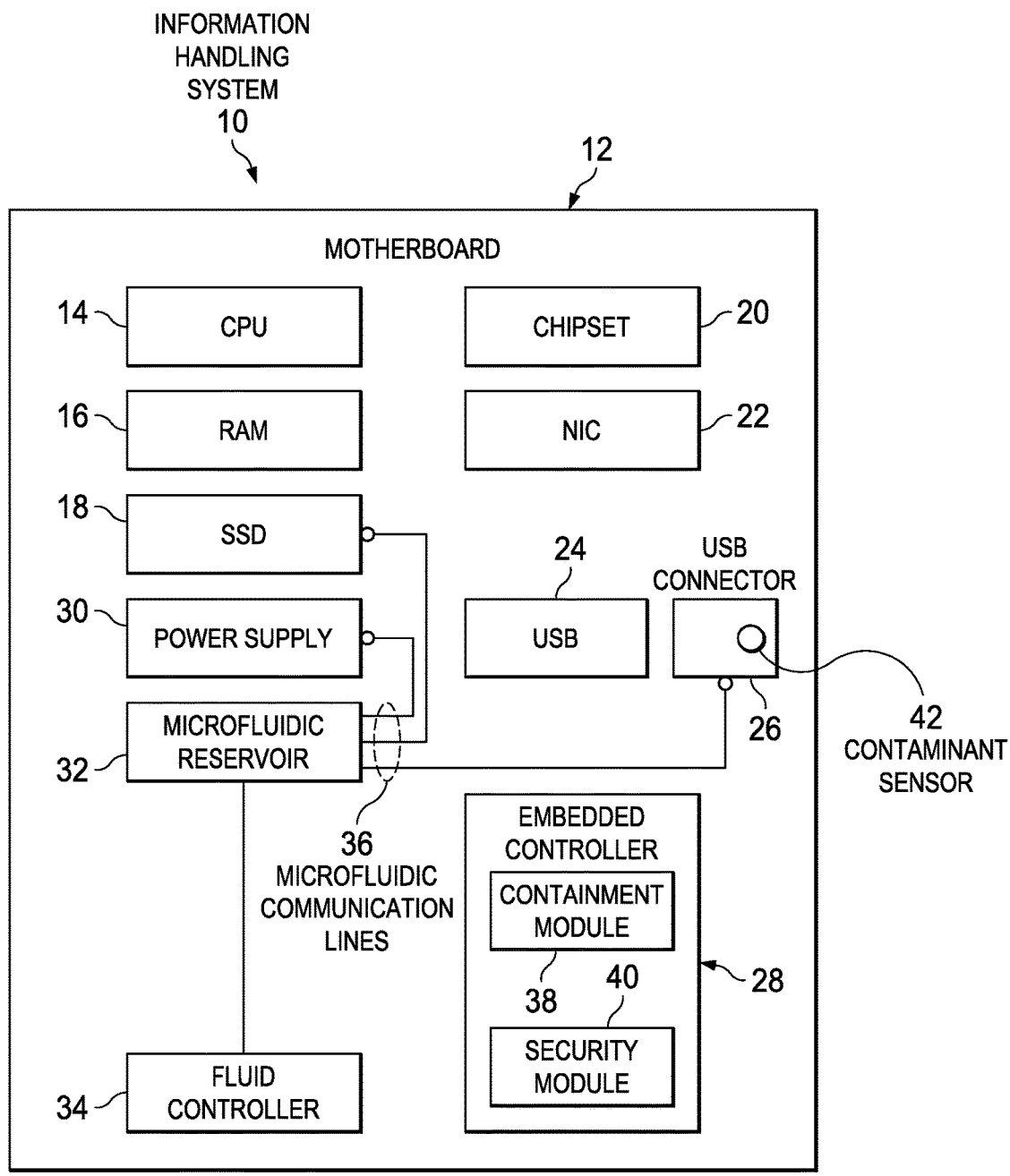
FIG. 1 depicts a block diagram of an information handling system configured to manage resources with microfluidic communication.

Referring now to FIG. 1, a block diagram depicts an information handling system 10 configured to manage resources with microfluidic communication. Information handling system 10 has a motherboard 12 that provides electrical communication between plural processing components. In the example embodiment, a central processing unit (CPU) 14 executes instructions and processes information stored in a random access memory (RAM) 16, such as with an operating system that executes applications and presents information to end users as visual images. A persistent storage device 18, such as a solid state drive or a hard disk drive, stores information during power off periods. A chipset 20 includes various processing elements and flash memory to support interaction between components, such as communication between CPU 14 and human interface devices. A network interface card (NIC) 22 provides an interface with network devices, such as Ethernet or wireless networks. A USB controller 24 provides an interface with physical cables through a USB connector 26 located at a port opening of a housing of information handling system 10. In alternative embodiments, other types of peripheral connections may be supported, such as DisplayPort or other display interfaces. Information handling system 10 components receive power and operate under the direction of an embedded controller 28 that includes management of a power supply 30. For example, embedded controller 28 has firmware instructions that are part of the system Basic Input/Output System (BIOS) to boot from an off state to an operational state. In some example embodiments, embedded controller 28 and/or related subsystems include security software that protects data stored on information handling system 10, such as part of a trusted bus or other security infrastructure that provides password protection, virus protection and/or monitoring of external accesses for proper authorization.

To provide additional security at information handling system 10, a microfluidic reservoir 32 and fluid controller 34 are disposed on or proximate to motherboard 12 and interfaced with physical components through microfluidic communication lines 36. For example, microfluids in reservoir 32 have behaviors that provide precise control and manipulations available in geometrically constrained areas so that the microfluidic system has relatively small volume, a small size, a low energy consumption and micro domain fluid characteristics in at least some portion of the structure. In the example embodiment, microfluidic communication lines are integrated in motherboard 12 as part of the printed circuit board manufacture process. In alternative embodiments, microfluidic communication lines may be added over top of or underneath motherboard 12. Fluid controller 34 includes a pump or other mechanism to transfer fluid to and from reservoir 32 with communication lines 36. For example, a contaminant module 38 interfaces with a contaminant sensor 42 and with fluid controller 34 to selectively close off USB connector 26 when contaminants are detected, such as water or dust. As another example, a security module 40 interfaces with physical components and fluid controller 34 to manage the physical components in the event a security issue is detected, such as a malicious code attack or an network infiltration by an unauthorized user. For instance, security module 40 commands fluid flow to power supply 30 to disconnect power to the processing components, to storage device 18 to disconnect power to the storage device or to other physical components that have strategic or security issues. For instance, a fluid communication line may disconnect power to portions of RAM 16 that store sensitive information, such as predetermined DRAM modules, while leaving other portions of RAM 16 powered to continue operations at information handling system 10 that relate to non-sensitive functions.

Figure 2:
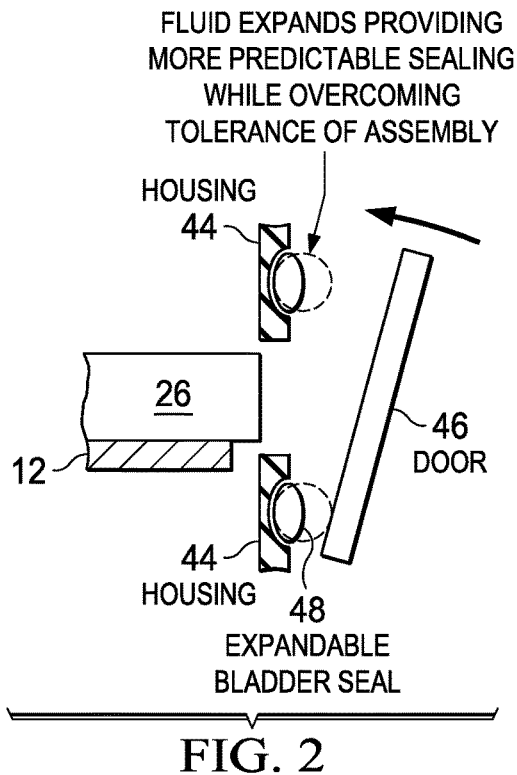
FIG. 2 depicts a side view of a housing having a port opening door sealed with microfluidic inflation of a bladder.

Referring now to FIG. 2, a side view depicts a housing 44 having a port opening door 46 sealed with microfluidic inflation of a bladder 48. In the example embodiment, bladders 48 at the edge of the opening in housing 44 deflate when door 46 opens and expand when door 46 closes. Microfluidic transfer of fluid into bladders 48 expand the bladders to provide a more predictable sealing that overcomes gaps associated with tolerance from manufacture assembly. Improved sealing of the opening in housing 44 protects connector 26 and circuit board 12 from ingress of contaminants, such as water and dust. In one embodiment, bladder 48 is a circular seal that encompasses the perimeter of the opening in housing 44 and is fed fluid through a communication line 36 routed through circuit board 12. In alternative embodiments, bladders 48 may include plural balloon structures that fill in portions of the interface of door 46 and housing 44 having particular vulnerability to contaminant ingress. Bladders 48 inflate automatically upon detection of a closing of door 46 and deflate automatically upon detection of an opening of door 46. Alternatively, bladders 48 remain deflated until contaminants are detected and then inflate to reduce the risk of contaminant ingress into housing 44.

Figure 3A:
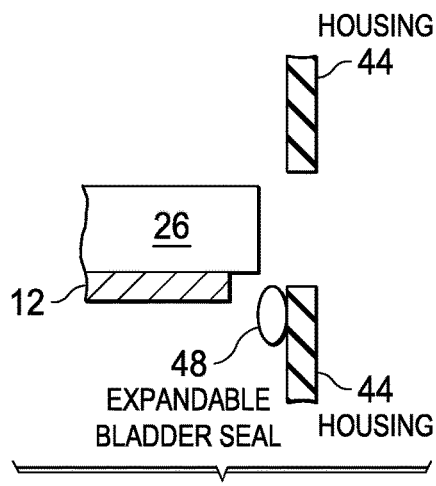
FIGS. 3A and 3B depict a side view of a port opening sealed with inflation of a microfluidic bladder.
Figure 3B:
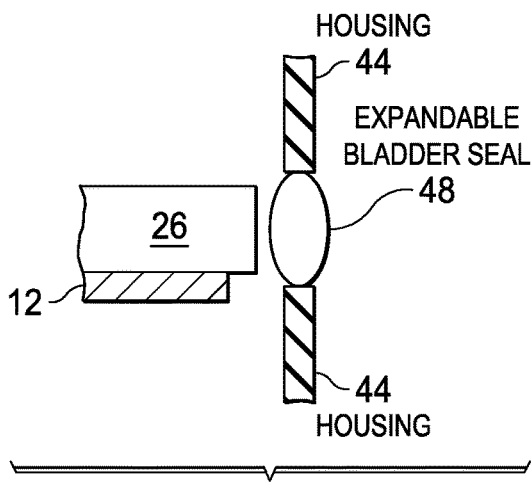

Referring now to FIGS. 3A and 3B, a side view depicts a port opening sealed with inflation of a microfluidic bladder 48. FIG. 3A depicts bladder 48 in a deflated state that provides an opening at housing 44 to allow passage of a cable into connector 26. FIG. 3B depicts bladder 48 inflated to seal the opening in housing 44 when a cable is not inserted in connector 26. Bladder 48 is automatically deflated upon detection of a cable aligned to insert into the opening of housing 44, such as in response to a signal from a cable sensor or an input by an end user indicating a cable insertion. Proximity of a cable to connector 26 may be detected with infrared, magnet/Hall switch, visual camera, RFID or other types of sensor arrangements that indicate a pending cable insertion to fluid controller 34. In one embodiment, one or more bladders 48 that deflate to allow a cable to pass into connector 26 automatically inflate around the cable when cable insertion completes to seal the port opening of housing 44 with the cable inserted. For example, fluid controller 34 fills bladders 48 after a USB detection is complete at connector 26 to hold the cable in a sealed engagement with connector 26; then fluid controller 34 deflates bladders 48 when initiation of removal of the cable from connector 26 indicates a disconnect has occurred with the USB interface.

Figure 4A:
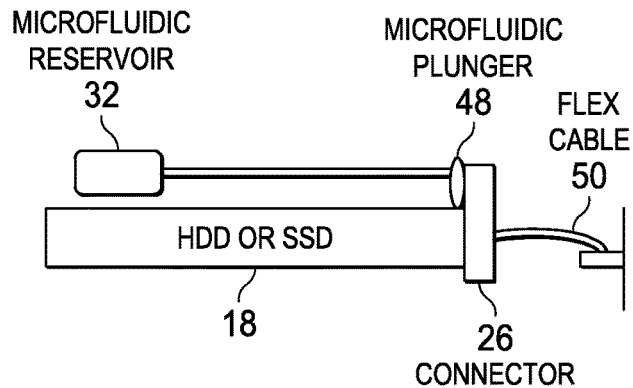
FIGS. 4A and 4B depict a side view of a storage device selectively removed from a connector interface with force applied by inflation of a microfluidic bladder.
Figure 4B:
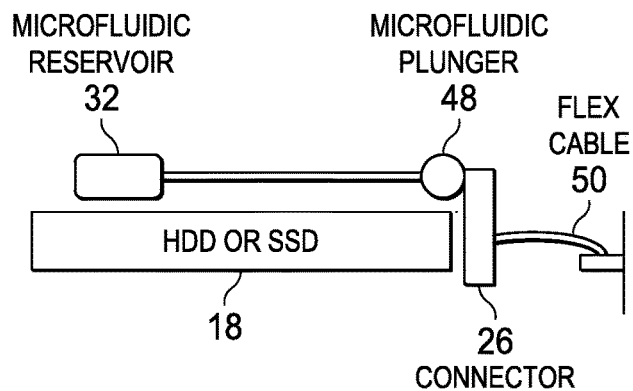

Referring now to FIGS. 4A and 4B, a side view depicts storage device selectively removed from a connector 26 interface with force applied by inflation of a microfluidic bladder 48. Microfluidic reservoir 32 selectively fills balloon 48 located proximate connector 26 so that balloon 48 acts as a plunger to push storage device 18 out of a connection with connector 26, thereby disabling access to information stored in storage device 18. A flexible cable 50 provides a biasing force to bias connector 26 back into a connecting interface with storage device 18 when balloon 48 deflates. In one example embodiment, security module 40 monitors security at information handling system 10 and disconnects storage device 18 if an information security issue arises, such as an unauthorized network interface seeking to retrieve stored information or detection of malicious code (i.e., a virus) seeking to destroy information. For example, a security module 40 executing on a trusted bus in the system BIOS actuates controller 34 with a GPIO to have microfluidic reservoir 32 transfer fluid under pressure to balloon 48 and thereby separate storage device 18 from connector 26.

Although FIGS. 4A and 4B depict a temporary disconnect of storage device 18 that is restored by biasing device flex cable 50, in alternative embodiments, other types of actions may be performed at other types of physical components to secure information. For example, controller 34 may select one or more different types of connectors to selectively disconnect based upon the type of threat. For instance, a microfluidic balloon 48 may disconnect a power supply connector, a local area network connector, a wireless networking component antenna, a DRAM memory module or any other type of removable component interfaced with an information handling system by a connector device. As another example, more permanent disabling actions may take place to address more serious data security infractions. For instance, inflation of a microfluidic bladder proximate a storage device may destroy the storage device to make information on the storage device irretrievable, such as by breaking the hard disk drive platter within a storage device. Thus, security module 40 may selectively prevent access to information where a security context indicates an information security risk and may destroy access to information where a security context indicates a physical security risk, such as an accelerometer indicating that an information handling system is stolen.

Figure 5:
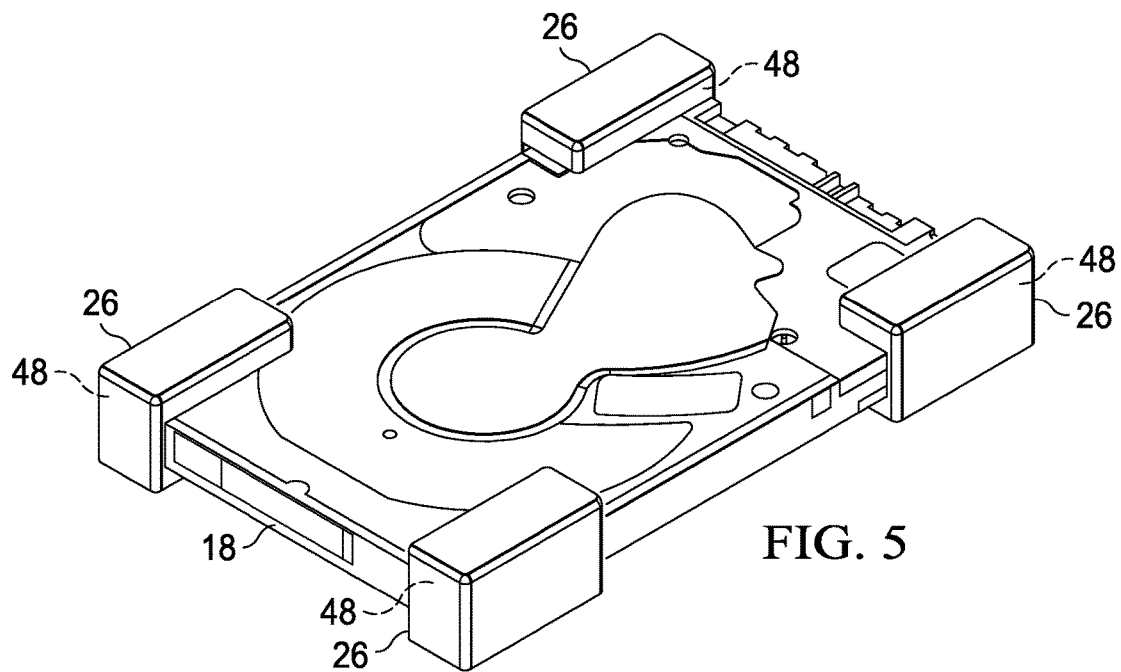
FIG. 5 depicts a storage device having multiple microfluidic bladders that inflate and deflate to modify storage device operation.

Referring now to FIG. 5, a storage device 18 is depicted having multiple microfluidic bladders that inflate and deflate to modify storage device operation. During normal operation, various inflation states of bladders 48 may modify vibration at the storage device to limit undesired acoustics. If an accelerometer indicates a freefall of storage device 18, full inflation of bladders 48 will help to limit damage on hitting the ground. If a security situation arises that calls for destruction of data, inflation of opposing ends with bladders 48 create a lateral force across the storage device that cracks the storage platter.

Figure 6:
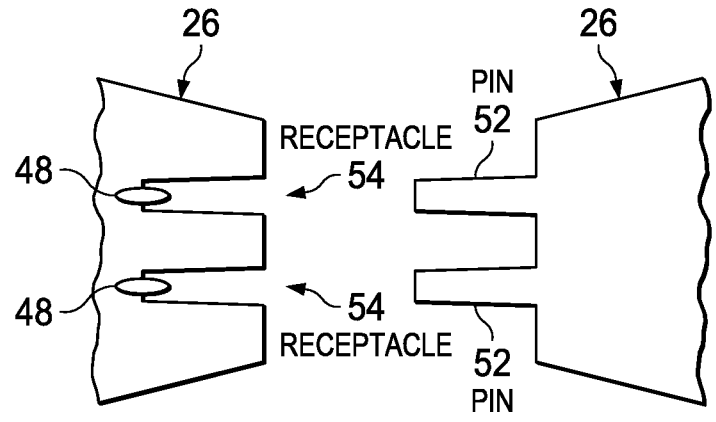
FIG. 6 depicts a side view of a connector with pins selectively disengaged by microfluidic bladders.

Referring now to FIG. 6, a side view depicts a connector 26 with pins 52 selectively disengaged by microfluidic bladders 48. Disconnection of an electrical interface at connector 26 may be performed as described above by having inflation of bladders 48 push pins 52 to move out of contact with receptacle 54. Alternatively, bladders 48 may inflate at each receptacle 54 to fill in the space between pins 52 and the connecting surface of receptacle 54 so that an electrical signal interface is broken. For example, spring connectors located within receptacle 54 are forced away from pins 52 as bladders 48 inflate.

Figure 7:
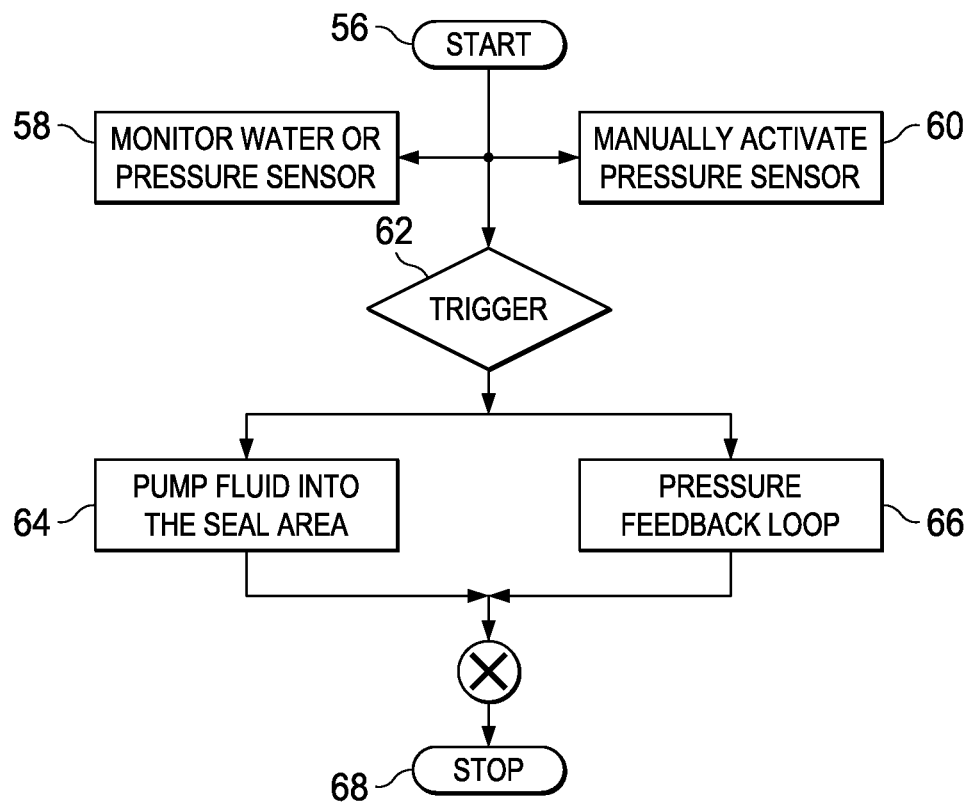
FIG. 7 depicts a flow diagram of a process for selectively applying fluid to one or more bladders.

Referring now to FIG. 7 depicts a flow diagram depicts a process for selectively applying fluid to one or more bladders. The process starts at step 56, such as at power up of an information handling system. At step 58, the area proximate a housing opening is monitored for fluid contaminates with a water or pressure sensor. At step 60, manual activation indications are monitored at the housing opening to indicate a user desire to seal a port, such as a switch triggered when a door closes over the opening. If a contaminant or manual activation are detected, then a trigger is issued and detected at step 62 to command sealing of the port. At step 64, in response to the trigger a pressure is applied at the microfluidic reservoir to pump fluid into a bladder located proximate the port and seal the port opening. At step 66, a pressure feedback loop is established to maintain pressure at the seal until removal of the trigger. At step 68, the process ends, such as with power down of the information handling system. In the powered down state, the bladder may stay inflated to help maintain seal protection while the system is not in use.

Figure 8:
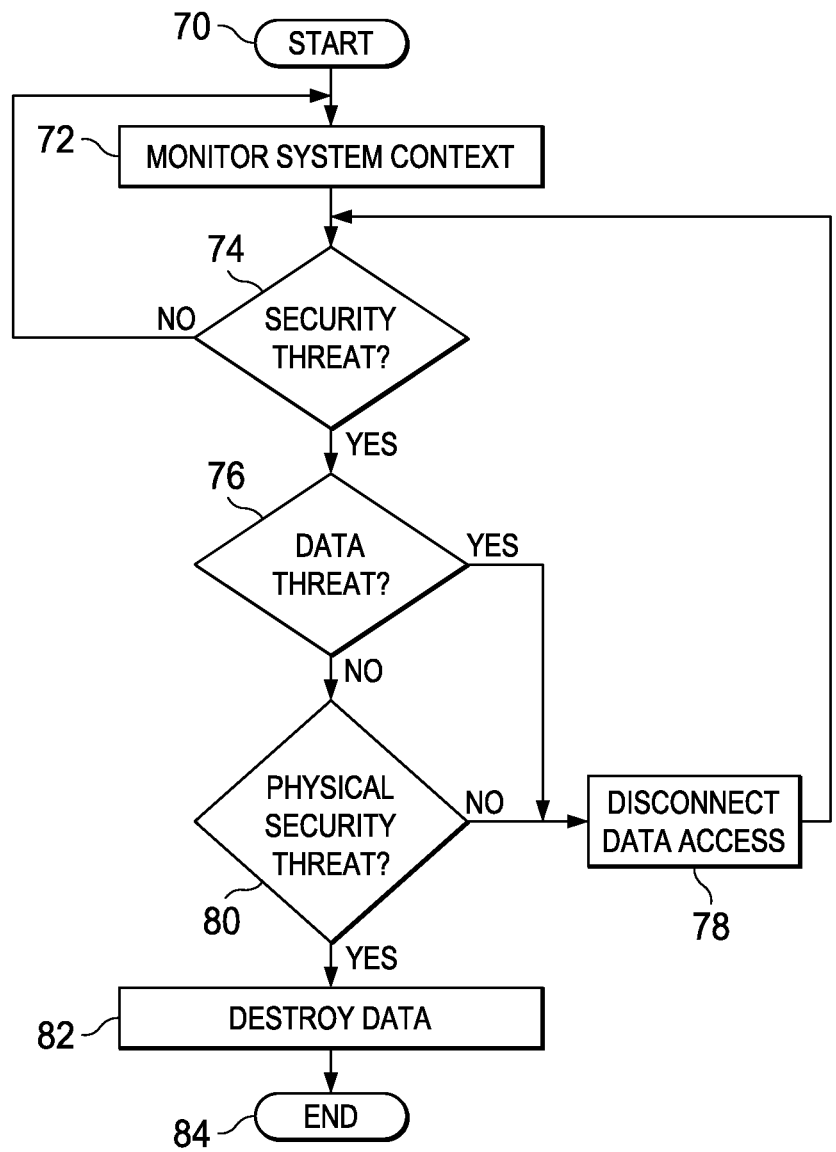
FIG. 8 depicts a flow diagram of a process for selectively applying fluid to bladders to address security risks.

Referring now to FIG. 8 depicts a flow diagram depicts a process for selectively applying fluid to bladders to address security risks. The process starts at step 70 with the information powered up and in an operational mode. At step 72, the information handling system's context is monitored for security threats, such as execution of malicious code, unauthorized network access or unauthorized physical access. At step 74 a determination is made of whether a security threat exists, and if not the process returns to step 72 to continue monitoring the system's context for security threats. If a security threat is detected at step 74, the process continues to step 76 to determine if the security threat is a data security threat. If so, the process continues to step 78 to disconnect data access and then to step 74 to continue monitoring for the data threat. The data access disconnection may include any physical manipulation of a processing component by inflation of a microfluidic bladder, such as disconnection of a storage device, a network interface or a power source. If at step 76 the detected security threat is not a data threat, the process continues to step 80 to determine if a physical data threat exists, such as physical possession of an information handling system by an unauthorized person. For example, an unauthorized possession of an information handling system may be indicated by an image captured of an unauthorized end user, an accelerometer indicating unexpected or unexplained motion of a system, or other sensed conditions. If at step 80 a physical threat is not detected, the returns to step 74 to continue monitoring to determine if security threat exists. If a security threat is detected at step 80, the process continues to step 82 to destroy data on the information handling system so that unauthorized access to the information is prevented.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having an opening;
   a processor disposed in the housing and operable to execute instructions to process information;
   a memory disposed in the housing and interfaced with the processor, the memory operable to store the information;
   an inflatable seal disposed in the opening and operable to selectively close off or expose the opening based upon one or more predetermined factors;
   a cable interface component disposed in the housing proximate the opening, the cable interface component aligned to couple with a cable inserted through the opening; and
   a cable detector interfaced with the inflatable seal and operable to inflate the seal upon detection of a first predetermined factor and deflate the seal upon detection of a second predetermined factor.

2. The information handling system of claim 1 further comprising:
   a cable interface component disposed in the housing proximate the opening, the cable interface component aligned to couple with a cable inserted through the opening; and
   a cable detector interfaced with the inflatable seal and operable to inflate the seal upon detection of a first predetermined factor and deflate the seal upon detection of a second predetermined factor.

3. The information handling system of claim 2 wherein the first predetermined factor comprises complete insertion of the cable into the opening.

4. The information handling system of claim 2 wherein the first predetermined factor comprises complete removal of the cable from the opening.

5. The information handling system of claim 2 wherein the second predetermined factor comprises partial insertion of the cable at the opening.

6. The information handling system of claim 2 further comprising a cleaning surface disposed on the seal and aligned to provide a cleaning action to the cable at insertion or removal of the cable.

7. The information handling system of claim 2 further comprising a microfluidic reservoir in fluid communication with the seal and operable to inflate the seal by inserting fluid into the seal and to deflate the seal by removing fluid from the seal.

8. The information handling system of claim 2 wherein the cable interface comprises a USB port.

9. A cable port comprising:
   a circuit board having circuits arranged to communicate signals between a cable and a processor;

a cable connector configured to couple with the cable;

a housing having an opening, the opening configured to accept the cable and align the cable with the cable connector; and an inflatable seal disposed at the opening, the seal selectively inflating to close the opening and deflating to close the opening.

10. The cable port of claim 9 further comprising a contaminant detector disposed proximate the opening and operable to command inflating of the inflatable seal upon detection of a contaminant.

11. The cable port of claim 9 further comprising:

a fluid reservoir interfaced with the seal; and a pressure controller interfaced with the fluid reservoir and operable to selectively increase and decrease pressure at the seal in response to one or more predetermined conditions.

12. The cable port of claim 11 further comprising a sensor disposed proximate the opening and operable to detect movement of a cable, the pressure controller decreasing pressure at the seal in response to detected movement and increasing pressure at the seal in response to ceasing of detected movement.

13. The cable port of claim 9 wherein the seal couples to an interior surface of the housing and inflates to fill the opening.

14. The cable port of claim 9 wherein the seal couples to an exterior surface of the housing and inflates of fill the opening.

* * * * *